United States Patent

Weissman

[15] 3,675,328
[45] July 11, 1972

[54] DENTAL ANCHOR

[72] Inventor: Bernard Weissman, 304 Ashland Place, Brooklyn, N.Y. 11217

[22] Filed: Dec. 21, 1970

[21] Appl. No.: 99,900

[52] U.S. Cl. .................................................. 32/15
[51] Int. Cl. ............................................... A61k 5/02
[58] Field of Search .......................... 32/15; 85/41

[56] References Cited

UNITED STATES PATENTS

| | | | |
|---|---|---|---|
| 3,434,209 | 3/1969 | Weissman | 32/15 |
| 2,289,785 | 7/1942 | Hutchison, Jr | 85/41 |

Primary Examiner—Robert Peshock
Attorney—Friedman & Goodman

[57] ABSTRACT

A dental anchor comprising an elongate member for anchoring a superstructure to a tooth. The elongate member includes at least two longitudinally spaced weakened portions which are defined by respective reduced thicknesses therein. Furthermore, the elongate member is provided with anchoring means or threaded portions spaced from one another by at least one of the weakened portions of reduced thickness. There is also provided a manipulating head which is spaced from one of the threaded portions by the other of the weakened portions of reduced thickness. The weakened portion of reduced thickness most remote from the manipulating head is of greater reduced thickness i.e., of lesser diameter than that of a weakened portion of reduced thickness most proximate the manipulating head. As a result, when the elongate member is inserted into a channel formed in the tooth, the threaded portion most remote from the manipulating head, severs automatically without overstressing the tooth thereby leaving the threaded portion most proximate the manipulating head in tact with the latter so that the latter threaded portion can be immediately inserted into a successive channel in the tooth without reloading the dental tool.

9 Claims, 8 Drawing Figures

PATENTED JUL 11 1972 3,675,328
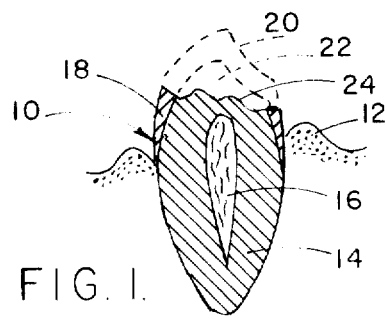
FIG. 1.
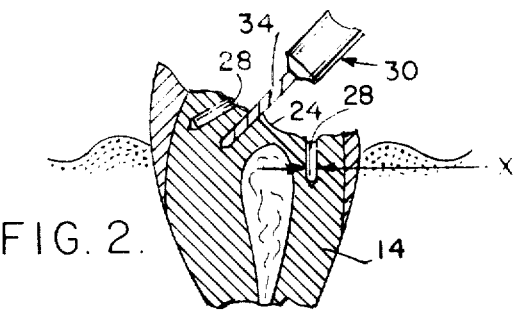
FIG. 2.
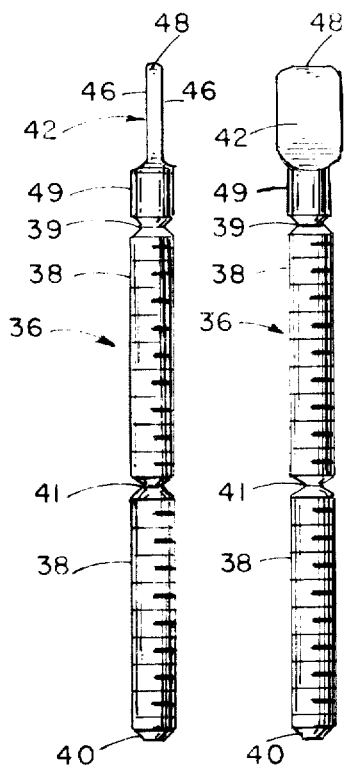
FIG. 6.   FIG. 7.
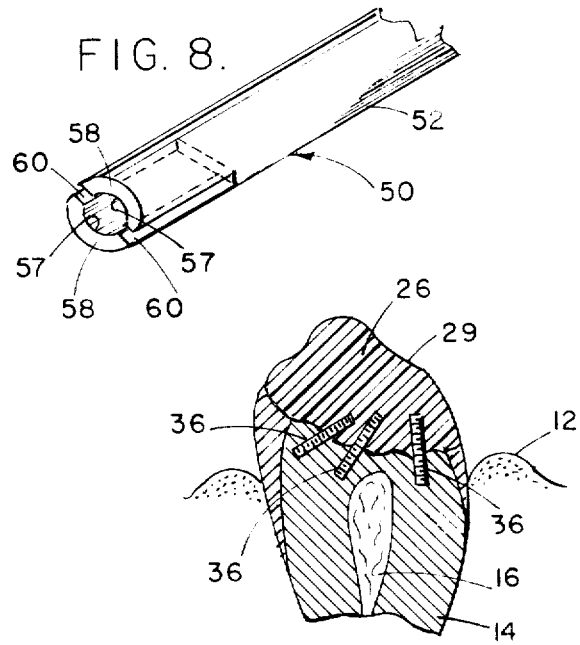
FIG. 8.
FIG. 5.
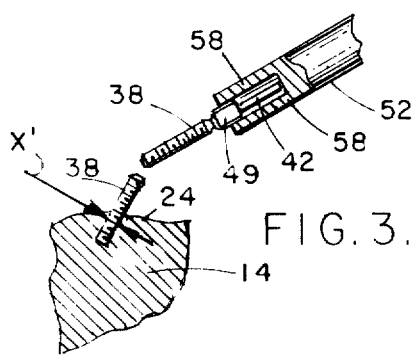
FIG. 3.
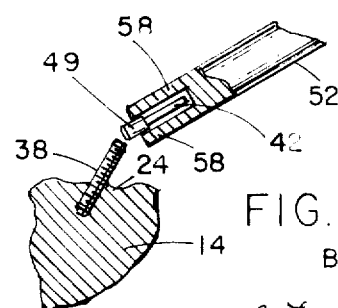
FIG. 4.
BERNARD WEISSMAN
INVENTOR
By Friedman & Goodman
ATTORNEYS 3,675,328

DENTAL ANCHOR

BACKGROUND OF THE DISCLOSURE

The present invention relates to dentistry in general and more particularly to an improvement in apparatus for building superstructures on broken or undermined dentition.

In the dental operation of anchoring a superstructure to the understructure, there are usually drilled a number of channels into the tooth or understructure. Anchoring rods are then inserted into the channels in protruding relation and the exposed portion of the rods is used for anchoring the superstructure. These rods are extremely small, i.e., on the order of 0.03 inches in diameter and 0.2 inches in length. These rods must first be loaded into the dental power tool and as a result of their extremely small nature they are difficult to handle and therefore difficult and burdensome to load into the dental power tool. When a plurality of channels and rods are necessary, the conventional operation is time-consuming and unsatisfactory since after each rod is inserted into the respective channels, the successive rods must be loaded into the tool.

SUMMARY OF THE INVENTION

Accordingly, it is an object of the present invention to provide a highly novel and effective means for building a superstructure on broken or undermined dentition.

Another object is to provide means whereby the potential support capacity of the understructure of the tooth is made available for anchoring the superstructure thereto.

A further object of the invention is to provide a highly novel, efficient and long lasting anchoring means whereby the superstructure is anchored to broken or undermined dentition.

Still another object of the invention is to provide anchoring means that are interconnected to one another and yet are readily severable from one another without overstressing the tooth to permit their successive respective insertions into the understructure without the necessity for successively reloading the dental tool therefor.

These objects are achieved in accordance with a preferred embodiment of the present invention, wherein the dental anchor comprises an elongate member for anchoring the superstructure to a tooth. The elongate member includes at least two longitudinally spaced weakened portions which are defined by respective reduced thicknesses therein. Furthermore, the elongate member is provided with anchoring means or threaded portions spaced from one another by at least one of the weakened portions of reduced thickness. There is also provided a manipulating head which is spaced from one of the threaded portions by the other of the weakened portions of reduced thickness. The weakened portions of reduced thickness most remote from the manipulating head is of greater reduced thickness i.e., of lesser diameter than that of a weakened portion of reduced thickness most proximate the manipulating head. As a result, when the elongate member is inserted into a channel formed in the tooth, the threaded portion most remote from the manipulating head, severs automatically without overstressing the tooth thereby leaving the threaded portion most proximate the manipulating head in tact with the latter so that the latter threaded portion can be immediately inserted into a successive channel in the tooth without reloading the dental tool.

BRIEF DESCRIPTION OF THE DRAWINGS

Other objects and many of the attendant advantages of the present invention will be readily appreciated and better understood by reference to the following detailed description when considered in connection with the accompanying drawing in which like reference numerals designate like parts throughout the figures thereof and wherein:

FIG. 1 is a cross-sectional view of a tooth or dentition with its surface excavated prior to building a superstructure thereon;

FIG. 2 is an enlarged view of a tooth similar to FIG. 1, and illustrates the step of providing channels in the dentition pursuant to the invention;

FIGS. 3 and 4 are views of a fragment of the tooth in FIG. 2 and illustrates the step of providing successive portions of the reinforcing or anchor rods in the channels and the separation of the latter portions pursuant to the invention;

FIG. 5 is a view similar to FIGS. 2 and illustrates the projection of the anchor rods into the built-up superstructure pursuant to the invention;

FIGS. 6 and 7 are enlarged side and front views respectively of a reinforcing or anchor rod illustrating the fracture grooves pursuant to the invention; and FIG. 8 is an enlarged fragmentary view of the chuck attachment for a dental tool used with the anchor rods.

DETAILED DESCRIPTION OF THE INVENTION

Referring now to the drawing, wherein like reference characters designate like or corresponding parts throughout the several views, there is shown in FIG. 1 a tooth or dentition 10 in the soft tissue or gingiva 12 of the human gum. As is well known to those skilled in the art, the body 14 of the tooth 10 is formed of dentin and encloses a pulp channel 16. The dentin projecting from the gingiva is covered by a layer 18 of enamel. In order to prepare the dentition for building a superstructure thereon, a portion 20 of the enamel and a portion 22 of the dentin are excavated, thereby to remove decayed and undermined understructure and form the excavated surface 24 free of decay.

The first step in providing a superstructure 26 (FIG. 5) pursuant to the present invention, is to provide a plurality of channels 28, as shown in FIG. 2, extending into the dentin 14 from the excavated surface 24. For this purpose, a spiral drill 30 is urged into the dentin in a conventional manner. As presently constructed, the bit 34 of drill 30 may have a preferred diameter of, for example, 0.028 inches. The number of channels 28 needed in a particular understructure will vary with the area of excavated surface 24 and portion of dentin 20 and enamel 22 that must be replaced by superstructure. Indeed, a single channel may be sufficient in some instances. However, more likely than not, a plurality of channels 28 are often necessary, and this requirement underscores the principles of the present invention, as will be discussed below.

The second step in providing a superstructure 26 pursuant to the present invention is to insert the reinforcing or anchor rods 36 into each of the channels 28. In the preferred embodiment, as seen in FIGS. 6 and 7, the anchor rods 36 are constituted of stainless steel, have self-threading body portions 38 provided with a bevel end 40 and a manipulating anchor head 42. Between the anchor head 42 and one body portion 38, a fracture groove 39 is provided to facilitate separating the anchor head 42 from the body portion 38. Similarly, between the adjoining body portions 38, there is provided a further fracture groove 41 to facilitate separating the body portions 38 from one another. The anchor head 42 is provided with torque transferring means or laterally opposing faces 46 which terminate in the marginal edge 48. The head 42 further includes a cylindrical guide portion 49 extending directly into the most proximate fracture groove 39. As presently constructed, in the preferred embodiment, the body portions 38 have a diameter of, for example, 0.030 inches. Consequently, it will be apparent that X', shown in FIG. 3 as representing the diameter of the body portion 38, is greater than the dimension X shown in FIG. 2 as representing the diameter of the channel 28. Thus, the body portions 38 may be tightly threaded into the respective channels 28.

A chuck attachment 50 is provided to insert anchor rods 36 into channels 28. As is best shown in FIG. 8, the chuck 50 is comprised of a body 52 having at one end thereof means for being connected to a dental power tool (not shown in the drawing). At its other end, the body 52 has a pair of laterally spaced limbs or gripping prongs 58 adapted to receive the anchor head 42 of the anchor rod 36. As will be noted in FIG. 8, the opening formed between the prongs 58 includes an axially extending bore defined by the partially cylindrical inner surfaces 57 of the prongs 58 which bore is diametrically extended to form restrictive channels 60 into which the lateral faces 46 of the anchor head 42 may be seated.

The third step is to insert a rod 36 into a channel 28. The head end 42 of a rod 36 is inserted and fully seated between the prongs 58. The chuck 50 by means of the dental power tool (not shown) is then used to guide the bevel end 40 of the anchor rod 36 into a channel opening 28. A slight downward pressure, in combination with a clockwise rotation is used to thread the anchor rod 36 to the bottom of channel 28. Since diameter X' exceeds diameter X, the lowermost portion 38 will thread itself into the dentin side walls of channel 28. When fully inserted into a channel 28, the anchor head 42, the remaining or uppermost body portion 38, and a small exposed portion of the lowermost or partially threaded body portion 38, all project above the excavated surface 24.

It is important to point out that the fracture groove 41 most remote from the head 42 is of greater reduced thickness i.e., of lesser diameter, than that of the fracture groove 39 most proximate the head 42. Thus, the fracture groove 41 has a greater tendency to fracture before that of the fracture groove 39. As a result, therefore, upon further clockwise rotation of the head 42, the body portion 38 most remote therefrom severs from the body portion 38 most proximate the head 42. Thus, there is left in tact, the head 42 and the remaining body portion 38, as shown in FIG. 3. The remaining body portion 38 can then be inserted into a further channel 28 without the necessity for reloading the chuck 50 which is of great importance inasmuch as the rod 36 is extremely small and difficult to handle otherwise.

Since a power tool is utilized for rotating the chucks 50 and thereby the rod 36, the rod 36 severs first at the more weakened portion 41 automatically without overstressing the tooth, and thus permits an immediate insertion of the remaining body portion 38 into a further channel 28, as shown in FIG. 3. The remaining body portion 38, after insertion into a further channel 28, as shown in FIG. 4, then also automatically severs at the less weakened portion 39 from the head 42 of the rod 36 and again without overstressing the tooth, thus permitting rapid execution of the anchoring process and obviating potential damage to the tooth as a result of prevention of overstressing the tooth.

Having a rod inserted in each challel, the ultimate step is to build the superstructure on the exposed excavated surface now provided with anchoring projections utilizing the potential support capacity of the understructure of the tooth for anchoring the superstructure thereto. This latter procedure, which does not form the basis of the present invention, has been described in my U.S. Pat. No. 3,434,209, issued on Mar. 25, 1969, to which reference may be made, and results in a repaired tooth, as shown in FIG. 5, wherein the superstructure 26, having an upper surface 29, is fixed to the understructure or body 14 of the tooth.

It should be understood, of course, that the foregoing disclosure relates to only a preferred embodiment of the invention and that it is intended to cover all changes and modifications of the example of the invention herein chosen for the purpose of the disclosure, which modifications do not constitute departures from the spirit and scope of the invention.

What is claimed is:

1. A dental anchor for insertion into a channel in a tooth, said dental anchor comprising an elongated body, said elongated body including weakened areas of reduced thicknesses to define spaced first and second fracture portions, first anchoring means disposed between said first fracture portion and one end of said elongated body, second anchoring means disposed between said first and second fracture portions, manipulating means disposed at an opposite end of said elongated body, said manipulating means including opposing faces terminating in a marginal edge, said manipulating means being spaced from said second anchoring means by said second fracture portion, said first fracture portion being of greater reduced thickness than any portion of said elongated body disposed between said first fracture portion and said manipulating means which includes said second fracture portion to provide said first fracture portion with a greater tendency to fracture than said second fracture portion, whereby said first anchoring means upon being seated in the tooth channel severs from said second anchoring means at said first fracture portion.

2. A dental anchor as claimed in claim 1, wherein said elongated body is a generally cylindrical rod.

3. A dental anchor as claimed in claim 1, wherein said anchoring means are constituted by threaded outer surfaces provided on said elongated body.

4. A dental anchor as claimed in claim 1, wherein said manipulating means includes guide means and torque transferring means for inducing torque in said elongated body through intermediary of said guide means.

5. A dental anchor as claimed in claim 4, wherein said guide means is constituted by a smooth cylindrical surface, and said torque transferring means is constituted by an extreme end portion including said opposing faces to define two laterally opposite flat surfaces extending from said smooth cylindrical surface.

6. A dental anchor as claimed in claim 5, wherein said extreme end portion is of laterally reduced thickness and of laterally increased width transversely of said laterally reduced thickness.

7. A dental anchor as claimed in claim 5, in combination with a dental attachment, said dental attachment comprising means for operative association with a power tool, and control means for operative association with said manipulating means, said control means including a pair of longitudinally extending extreme end limbs laterally spaced from one another, said extreme end limbs having mutually opposing partially cylindrical inner surfaces respectively for cooperatively receiving the smooth cylindrical surface of said guide means, said extreme end limbs further having mutually opposing flat inner surfaces laterally extending from said partially cylindrical surfaces thereof for receiving and applying torque against the flat surfaces of said torque transferring means.

8. The combination as claimed in claim 7, wherein said extreme end limbs are spaced from one another over a longitudinal length which is less than the longitudinal length of said manipulating means such that the latter protrudes partially when fully seated in said attachment.

9. A dental anchor as claimed in claim 1, wherein said first and second fracture portions of said elongated body are constituted by peripherally extending reduced thicknesses in said elongated body.

* * * * *